United States Patent [19]

Cuellar et al.

[11] Patent Number: 4,630,176

[45] Date of Patent: Dec. 16, 1986

[54] POLYOXOMETALATE-MODIFIED CARBON ELECTRODES AND USES THEREFOR

[75] Inventors: Edward A. Cuellar, Shaker Heights; Michael J. Desmond, Cleveland Heights, both of Ohio

[73] Assignee: The Standard Oil Company, Cleveland, Ohio

[21] Appl. No.: 801,111

[22] Filed: Nov. 22, 1985

[51] Int. Cl.[4] .............................................. H01G 9/00
[52] U.S. Cl. .................................................... 361/433
[58] Field of Search ........................ 361/433; 204/294

[56] References Cited

U.S. PATENT DOCUMENTS

| | | | |
|---|---|---|---|
| 3,536,963 | 10/1970 | Boos | 361/433 A |
| 3,652,902 | 3/1972 | Hart et al. | 361/433 A |
| 3,656,027 | 4/1972 | Isley | 361/433 A |
| 4,438,481 | 3/1984 | Phillips et al. | 361/433 A |
| 4,542,444 | 9/1985 | Boland | 361/433 A |

Primary Examiner—Donald A. Griffin
Attorney, Agent, or Firm—Sue E. McKinney; Joseph G. Curatolo; Larry W. Evans

[57] ABSTRACT

Improved activated carbon electrodes are disclosed which electrodes have increased charge storage capacity and reduced leakage current. Such improved electrodes are incorporated into energy storage devices such as electric double layer capacitors. The improved charge storage capacity is due to the adsorption of polyoxometalate compounds onto the activated carbon, and reduced leakage current is achieved by stabilizing the polyoxometalate compounds within the activated carbon through the use of a compound capable of generating at least one ionic site.

20 Claims, 1 Drawing Figure

POLYOXOMETALATE-MODIFIED CARBON ELECTRODES AND USES THEREFOR

FIELD OF THE INVENTION

The present invention relates to the modification of activated carbon-based electrodes with polyoxometalate compounds. The modified electrodes possess greater charge storage density than unmodified carbon electrodes as the polyoxometalate does not detract from the charge storage function of the carbon electrode, but does store charge through a secondary reaction mechanism.

BACKGROUND OF THE INVENTION

Energy generation and storage has long been a subject of study and development. Of special importance is the storage of energy in a compact portable system that can be easily charged and discharged, such as rechargeable batteries and capacitors. Individual components of such systems have been individually investigated and optmized generally by seeking to achieve a maximum stored energy density. However, most commercially exploited systems yield far less than their theoretical energy density.

One such energy storage system utilizes activated carbon electrodes to store ions therein, which upon discharge release the ions to generate an electrical current. An example of an activated carbon electrode system is the electric double layer capacitor system described in U.S. Pat. No. 3,536,963 entitled "Electrolytic Capacitor Having Carbon Paste Electrodes" to Boos. The mechanism for energy storage is based on the formation of an electrical double layer at the interface between an activated carbon electrode and a supporting electrolyte under an applied electric field. These devices will accept and store significant amounts of energy at any available potential over which the device is stable, unlike batteries where a given threshold voltage must be exceeded. Optimization of this system is based on the optimization of the charge storage capacity of the activated carbon electrode used therein. It has been found that the capacity of such an electric double-layer capacitor can amount to several tens of farads per gram of activated carbon when the activated carbon has a surface area in excess of 1000 $m^2/g$.

Copending patent application, U.S. Ser. No. 769,925 entitled "Polyoxometalate—Modified Carbon Electrodes and Uses Therefor" describes improved activated carbon electrodes having enhanced charge storage density. As described therein, a polyoxometalate compound is adsorbed into activated carbon to significantly improve the charge storage capacity of a device which incorporates the modified carbon as an electrode therein. Polyoxometalate species capable of undergoing reversible, multiple electron reduction-oxidation steps over the range of potentials applied to the energy storage device exhibit an electrochemical response resembling the charge charasteristics of the activated carbon electrode. This combination leads to devices having enhanced charge storage capabilities with discharge curve characteristics similar to a like device using an unmodified activated carbon electrode.

An electric double layer capacitor as disclosed in U.S. Pat. No. 3,536,963 which incorporates polyoxometalate-modified carbon electrodes exhibits charge storage capacities that are up to about one-hundred percent greater than the charge storage capacity of a like device which utilizes unmodified carbon electrodes.

However, it has been found that electric double layer capacitors utilizing a microporous separator and incorporating these polyoxometalate-modified carbon electrodes also exhibit undesirably high leakage currents. Leakage current, as used herein, is the continuous current that passes through a fully charged cell to maintain steady state voltage conditions. Leakage current can be measured by the amount of current required to maintain a constant voltage in the cell after full charge is obtained. The leakage current of electric double layer capacitors utilizing polyoxometalate-modified carbon electrodes is high for very low current applications, such as computer back-up applications. This increased leakage current may be due to transfer of polyoxometalate through the cell's microporous separator. The use of a cation-exchange membrane about eliminates the increased leakage current, but such membranes are expensive and more difficult to process than a microporous separator material.

Thus, it would be a technical improvement to provide a polyoxometalate-modified activated carbon wherein the polyoxometalate was stablized on the activated carbon.

It is, therefore, one object of the present invention to provide a polyoxometalate-modified activated carbon electrode having a relatively high charge storage capacity wherein the polyoxometalate is stably disposed on the activated carbon.

It is another object of the present invention to provide a process for stably disposing a polyoxometalate compound on an activated carbon.

It is yet a further object of the present invention to provide an electric double layer capacitor incorporating stably-disposed polyoxometalate-modified activated carbon electrodes therein.

These and other objects of the present invention will become apparent to those skilled in the art from the below description of the invention.

SUMMARY OF INVENTION

The present invention relates to an improved carbon-based electrode, which electrode comprises an activated carbon electrode having a polyoxometalate compound stablized on the activated carbon surface by a compound capable of generating at least one ionic site. Preferably, the compound is capable of generating multiple ionic sites. Most preferably, the compound capable of generating at least one ionic site is an amine.

The invention also relates to a process for making an improved carbon-based electrode comprising the steps of contacting a polyoxometalate compound and a compound capable of generating at least one ionic site in the presence of activated carbon so as to stably dispose the polyoxometalate on the activated carbon. The process may occur by an ion exchange reaction or by an acid/base reaction.

In additon, the present invention relates to an energy storage device comprising a pair of electrodes electrically isolated from each other, an electrolyte in contact with the electrodes, and means for collecting electrical current therefrom; at least one electrode comprising an activated carbon electrode having a polyoxometalate compound stabilized on the activated carbon surface by a compound capable of generating at least one ionic site.

The invention further relates to an electric double layer capacitor comprising a housing, at least one pair of spaced-apart activated carbon electrodes in the housing, an electrolyte in contact with the electrodes, and an ionically conductive separator interposed between the electrodes and in contact therewith, the electrodes comprising activated carbon having a polyoxometalate compound and a compound capable of generating at least one ionic site stablized on the activated carbon surface.

DETAILED DESCRIPTION OF THE INVENTION

In accordance with the present invention there is disclosed an improved, activated carbon electrode having a polyoxometalate compound adsorbed therein and stabilized by means of a compound capable of generating at least one ionic site.

Polyoxometalate compounds can be represented by the formula:

$$A_a[L_lM_mJ_zO_y]$$

wherein
- A is at least one ion selected from the group consisting of hydrogen, the Group I-A to VIII-A or I-B to VII-B elements, the rare earths or actinides, ammonium, alkyl ammonium, alkyl phosphonium and alkyl arsonium;
- L is at least one element selected from the group consisting of hydrogen and Group III-B to VII-B elements;
- M is at least one metal selected from the group consisting of Group I-A to IV-A metals, Group VII-A to II-B metals, the rare earths and actinides; and
- J is at least one metal selected from the group consisting of Group V-A metals and Group VI-A metals; and
- a is a number which when multiplied by the valence of A will balance the charge on the polyoxometalate complex within the brackets;
- l is a number ranging from zero to about 20;
- m is a number ranging from zero to about 20;
- z is a number ranging from about 1 to about 50; and
- y is a number ranging from about 7 to about 150.

Preferably L is at least one element of the group P, As, Si, Al, H, Ge, Ga and B; M is at least one element of the group Zn, Ti, Mn, Fe, Co, Ni, Rh, Zr and Re; and J is at least one metal of the group Mo, W and V. Preferably l ranges from zero to about 4; m ranges from zero to about 6; z ranges from about 6 to about 24; and y ranges from about 18 to about 80.

The species described above comprising $JO_6$ octahedra are referred to as isopolyoxometalates. Other elements can be incorporated to limited extents into the metal oxide lattice structure, resulting in species recognized as heteropolyoxometalates. Many of the isopolyoxometalate and heteropolyoxometalate complexes are capable of sustaining reversible redox reactions; being able to transfer or accept from one to more than thirty-two electrons in several well-defined steps over a wide voltage range of from about 1.0 volt to about −2.5 volts vs. a Ag/AgCl reference electrode.

Examples of polyoxometalate compounds include, but are not limited to hexametalate anions $[M_mJ_{6-m}O_y]$, the Keggin anions $[L_{1\ or\ 2}M_mJ_{12-m}O_y]$ and the Dawson anions $[L_{2\ to\ 4}M_mJ_{18-m}O_y]$.

A specific example of a heteropolyoxometalate is the compound $H_3PW_{12}O_{40}$ which exhibits a typical molecular structure of a Keggin anion.

Other examples of heteropolyoxometalates having the same structure include $H_4SiW_{12}O_{40}$, $H_3PMo_{12}O_{40}$, $H_5PMo_{10}V_2O_{40}$ and $H_4PMo_{11}VO_{40}$. It is understood that these examples are merely illustrative of heteropolyoxometalates and not intended to be limitative of the class of heteropolyoxometalates.

Activated carbon electrodes utilized in energy storage devices generally have BET surface areas of from about 100 m$^2$/g to about 2000 m$^2$/g, and preferably have BET surface areas of from about 500 m$^2$/g to about 1500 m$^2$/g. The surface area of activated carbon is mostly internal and can be produced in most naturally occurring carbonaceous materials by known activation methods. It has been found that the ability of an activated carbon electrode to store energy is generally proportional to its surface area, although the carbon source, method of activation and additional processing treatments can also significantly affect the properties of activated carbons.

Polyoxometalate compounds disposed on activated carbon may not be strongly adsorbed, that is a portion of the polyoxometalate may merely be weakly held in the micropores of the carbon material and may be easily soluble in electrolyte materials such as sulfuric acid. It is therefore possible for the polyoxometalates to migrate through an activated carbon electrode and electrolyte and pass across a microporous separator, which would increase the leakage current of an energy storage device incorporating such electrode materials therein.

As taught herein a compound having or capable of forming at least one, and preferably multi-ionic, sites is incorporated into polyoxometalate-modified activated carbon electrodes to produce greater localization of the polyoxometalate on the carbon by lowering its solubility. Less soluble polyoxometalates are less likely to migrate throughout an electrolyte, thereby reducing the leakage current of a device in which such materials occur.

The replacement of one or more protons of a polyoxometalate complex with a large cation generally reduces the complex's solubility. As an example, the Cs$^+$ and $(C_3H_7)_4N^+$ salts of $H_4PMo_{11}VO_{40}$ are much less soluble in acid solutions, such as a sulfuric acid electrolyte solution, than the fully protonated species.

In accordance with the present invention, a polyoxometalate compound may be disposed more stably onto an activated carbon material through the formation of a material with very low solubility, such as by using large, multisite cations capable of chelating the polyoxometalate in an ionic fashion. The adsorbed polyoxometalate species can be stabilized by (1) ion exchange between a polyoxometalate species already adsorbed onto the carbon and a compound capable of forming at least one ionic site, also referred to herein as an ion, (2) ion exchange of a soluble polyoxometalate ion from solution into a carbon previously doped with the desired ion; (3) by an acid/base reaction between an activated carbon having been made basic or acidic by an adsorbed compound capable of forming at least one ionic site and a polyoxometalate which is acidic or basic, respectively; or (4) by an acid/base reaction between an activated carbon having been impregnated with a polyoxometalate compound to become acidic or basic and a compound capable of forming at least one ionic site which is basic or acidic, respectively.

When the polyoxometalate compound is stablized by ion exchange with the polyoxometalate species already adsorbed onto activated carbon, the exchange may be with any ion that reduces the solubility product of the polyoxometalate species previously adsorbed onto the carbon. This may be accomplished by using the same or a different solution for impregnation of the carbon with the polyoxometalate species and the chosen ion. Preferably, the polyoxometalate is an anion and the solution electrolyte is acidic. The ion may be formed in-situ from a neutral base which will protonate in the electrolyte.

The ion is chosen to produce the desired reduced solubility product and is also an ion which will not undergo a faradaic process leading to degradation of the performance of a device in which such electrode material is used. It is further preferred that the ion be multidentate and capable of being associated with more than one site of an adsorbed polyoxometalate species. Preferably the compound from which the ion is obtained is an amine, such as pyridine, polyvinylpyridine, diethylenetriamine, dipropylenetriamine and tetraethylenepentamine. Other amine compounds suitable for use in such an ion exchange would be obvious to those skilled in the art.

When the polyoxometalate is stabilized by ion exchange of a soluble polyoxometalate ion from solution into a carbon that has been previously doped with the desired ion, the solubility product of the resulting adsorbed polyoxometalate species is lower than it would have been in the absence of ion exchange. The activated carbon may be doped and ion exchanged with the polyoxometalate in the same or a different electrolyte solution.

The polyoxometalate compound may also be stably disposed within the activated carbon micropores by an acid/base reaction. In one embodiment, the activated carbon is made basic by the physical adsorption of a base, or chemical modification of the carbon surface with a base. A polyoxometalate acid is then introduced to the basic activated carbon to react with the base, in the Bronsted-Lowry sense, so as to form an adsorbed ion pair comprising a polyoxoanion and the protonated base. There may also be direct coordination by a donor atom to a peripheral heteroatom in a polyoxometalate compound that possesses an open site or a weakly bound exchangeable ligand, after the Lewis concept of acidity/basicity.

It is preferred that the base be multidentate and capable of being associated with more than one site of an adsorbed polyoxometalate species. In the acid-base reaction, it is most preferred that the compound chosen to provide the base be an amine compound. Examples of amine compounds that are preferred for use in the acid/base reaction include pyridine, polyvinylpyridine, diethylenetriamine, dipropylenetriamine and tetraethylenepentamine. Other amine compounds suitable for use in such an acid/base reaction would be obvious to those skilled in the art.

The ion-stabilized, polyoxometalate-modified activated carbon can be used as an electrode in an energy storage device to exhibit greater charge storage capacity than a similar device incorporating an unmodified activated carbon electrode and lower leakage current than a similar device having a polyoxometalate-modified activated carbon, but not ion stabilized, electrode. In the discussion that follows, reference will be made to the utilization of ion-stablized, polyoxometalate-modified activated carbon electrodes in an electric double layer capacitor as described in U.S. Pat. No. 3,536,963 to Boos, but it is understood that the advantages due to the improved electrode of the present invention are similarly realized in other energy storage devices that may use activated carbon electrodes.

BRIEF DESCRIPTION OF THE DRAWINGS

The invention will be more clearly understood with reference to the following FIGURE wherein.

DETAILED DESCRIPTION OF THE DRAWING

Figure 1:
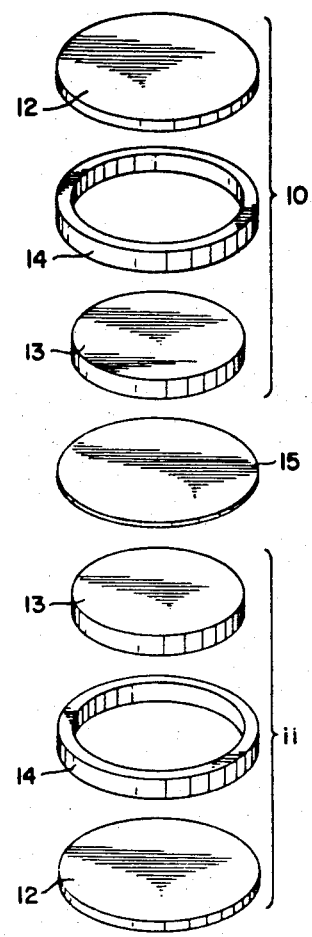
FIG. 1 is an exploded view of the components of a single cell electric double layer capacitor.

Referring now to the drawing, FIG. 1 depicts a double layer capacitor comprising a pair of identical electrode assemblies 10, 11. Each electrode subassembly includes an electrically conducting and ionically insulating member 12 which can be made of carbon, lead, iron, nickel, tantalum, conductive butyl rubber or any impervious conducting material. Member 12 is characterized by its electrical conducting property and its chemical inertness to the particular electrolyte employed at the potential impressed upon it. Its primary functions are as a current collector and an inter-cell ionic insulator. If the particular electronic and ionic insulating member is susceptible to corrosion by the electrolyte or is not completely impervious, thus permitting the electrolyte to seep through and corrode adjoining components, the surfaces of the member can be provided with a coating of a noble metal or a substance such as colloidal graphite in a solvent such as alcohol, to minimize such problems. This procedure is also effective in reducing leakage currents by better than a factor of 10.

Annular means or gasket 14 is preferably affixed to conducting member 12. Since electrode 13 is not a rigid mass but is to some extent flexible, the principal function of gasket 14 is to confine electrode 13 and prevent the mass of the electrode material from creeping out. The gasket material is preferably an insulator such as butyl rubber, although it need not necessarily be that. It should be flexible to accommodate expansion and contraction of the electrode. Other obvious ways of confining the electrode would be apparent to those skilled in the art.

Separator 15 is generally made of a highly porous material which functions as an electronic insulator between the electrodes yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. The separator can also be a nonporous ion-conducting material, such as an ion exchange membrane. Any conventional battery separator should be suitable, and materials such as porous polyvinyl chloride, glass fiber filter paper, porous polypropylene, cellulose acetate and mixed esters of cellulose may be used. Prior to its use the separator is generally saturated with electrolyte. This can be accomplished by soaking the separator in the electrolyte for about 15 minutes or less.

Carbon electrode 13 in accordance with the present invention comprises activated carbon having a polyoxometalate capable of multiple reverse redox reactions adsorbed therein and stabilized with an amine compound, as well as an electrolyte. The activated carbon may be imbued with the electrolyte either before or after it is modified with the polyoxometalate compound. Likewise, the activated carbon may also be simultaneously exposed to both the electrolyte and the polyoxometalate compound, without suffering adverse charge storage characteristics to any of the components. The preferred method may vary with various polyoxometalates and the polyoxometalate is stabilized with a compound capable of forming at least one ionic site in accordance with the process taught herein.

The electrolyte should consist of a highly conductive medium such as an aqueous solution of an acid, salt or base. Examples of suitable aqueous electrolytes are: ammonium chloride, sodium chloride, calcium chloride, potassium chloride, potassium carbonate, sulfuric acid, fluoroboric acid, sodium hydroxide, potassium hydroxide, etc. The pH of the solution must be chosen so that the polyoxometalate remains stable as used. The pH may vary with various polyoxometalates.

The electrolyte in the electrode structure serves three functions: (1) as a promoter of ion conductivity, (2) as a source of ions, and (3) as a binder for the carbon particles. Sufficient electrolyte should be used to accomodate these functions. A separate binder can be used to perform the electrolyte's binder function, however, the separate binder would add an element of resistance which is undesirable.

The pressure applied to form the electrodes is dependent on many variables such as the dimensions of the electrode, particle size of the carbon material and particular electrolyte used. It should be limited to leave an amount of electrolyte within the electrode structure sufficient to accomplish its three functions referred to above.

A pair of electrodes thus produced are placed within a separate annular member 14 which is affixed to a circular plate 12. A separator membrane is interposed between the two electrodes and this capacitor cell is disposed on a lower platen of a press. The upper platen is brought down upon the cell until the surfaces make contact and a concentric ring is slipped over the cell. At this point, the capacitor cell is confined by the upper platen, the lower platen, and the concentric ring. The cell is then compressed at a pressure sufficient to render the cell a coherent structure. Pressure on the order of about 2,000 p.s.i. has been found sufficient.

EXAMPLES

The following examples demonstrate the increased charge storage ability and low leakage currents of activated carbon electrodes that have been modified with polyoxometalates which were stabilized on the activated carbon with compounds capable of forming at least one ionic site.

EXAMPLE 1

This example illustrates the subject invention whereby the polyoxometalate is stablized by an amine through an ion exchange process. Four different amines are used in separate tests to show their ability to stabilize the polyoxometalate. Two controls, one in which the activated carbon is unmodified and one in which the activated carbon is modified with a polyoxoanion but not stabilized with an amine, are also presented for comparison. In each test, the carbon was utilized as the electrode material in an electric double layer capacitor.

The carbon used in the electrodes of this Example was an activated carbon commercially available under the tradename PWA from the Calgon Carbon Corporation. This carbon had a BET surface area of about 1142 $m^2/g$ and a pore diameter (Angstrom) to pore area $(m^2/g)$ distribution of about as follows: <20/1059; 20-30/51; 30-40/11; 40-50/3; and 60-300/12.

The polyoxometalate used to modify this carbon was $H_4PMo_{11}VO_{40}$. This polyoxometalate was stabilized with various amines in the following ion exchange manner:

A carbon slurry was prepared by mixing from about 14 g to about 20 g of PWA carbon with 25 weight percent $H_2SO_4$ until a clear $H_2SO_4$ solution layer was observed on settling of the carbon. The carbon was soaked in this manner for about five days. The carbon slurry was then stirred vigorously while $H_4PMo_{11}VO_{40}$, prepared by the method of Tsigidnos and Hallada (Inorganic Chemistry, Vol. 7, pp. 437–441, 1968), was added. A blue color developed immediately signifying that some reduction of $H_4PMo_{11}VO_{40}$ was occurring. This slurry was allowed to soak for about five additional days, with occasional stirring, then filtered to remove the blue liquid phase. A slurry was then reformed with the polyoxometalate-modified carbon suspended in 25 weight percent $H_2SO_4$.

To such a solution was then added one of the following amines; 1 ml of ninety-five weight percent diethylenetriamine (DETA), 1 ml. of reagent grade pyridine, 0.28 g polyvinylpyridine (PVP) dissolved in 25 ml of $H_2SO_4$, or 1 ml of technical grade tetraethylenepentamine (TEPA).

The carbon was allowed to soak under the above conditions for about one additional day with occassional stirring. The carbon was then isolated by filtering or decanting off the solution phase, handpressed between sheets of adsorbant paper, and then further pressed between sheets of adsorbent paper in a die at about 6,000 psi RAM force. The carbon was then grated through a 20 mesh screen. This modified carbon material was then processed into an electrode and assembled into a capacitor cell similar to that shown in FIG. 1. Unmodified PWA carbon, in as-received condition, was processed into an electrode in accordance with the above technique, with the exception that no polyoxometalate solution or amine was incorporated into the carbon slurry, and assembled into a capacitor cell similar to the capacitor shown in FIG. 1. PWA carbon was also processed into an electrode as described above but omitting the step of adding an amine compound to the solution and used to fabricate a capacitor cell similar to that shown in FIG. 1.

The fabrication of the electrodes and capacitors were as follows; electrode pellets, each about 2.86 cm (1.125 inches) diameter by about 0.32 cm (0.125 inch) thick, and containing about 5.2 g of the selected carbon, were pressed from a die at 6,000 psi RAM force. The pellets were loaded into gaskets of butyl rubber. The gaskets were sealed on one face with a disk of conductive butyl rubber to serve as a current collector. This was affixed to the gasket with an adhesive. Each pellet was then uniformly wetted with about 0.2 ml of 25 weight percent $H_2SO_4$. A dry, porous polypropylene membrane was interposed between a pair of similar electrode assemblies to form a cell. The membrane was sealed to each butyl rubber gasket with adhesive. Each completed cell, similar to the cell shown in FIG. 1, was placed between brass contacts in a compression fixture at 3,000 psi RAM force. Electrical connections were provided between the cell and a power supply without regard to polarity since both half-cells were equivalent. However, polarity was always maintained the same in all tests with each cell.

Parameters characterizing the performance of six such cells; one utilizing control unmodified activated carbon electrodes, one incorporating polyoxometalate-modified activated carbon electrodes, and four using polyoxomltalate-modified and amine-stabilized activated carbon electrodes, at a charging potential of 1.0 volt and an ambient temperature of approximately 20°–25° C. are listed in Table 1.

TABLE 1

Electrical Properties of Capacitors Having Various Modified Capacitor Electrodes

| CAPACITOR ELECTRODE | CYCLE | CHARGING TIME (hrs.) | DAYS ON TEST | LEAKAGE CURRENT (ma) | CAPACITANCE (farads/g) |
|---|---|---|---|---|---|
| Unmodified | 1 | 17 | 1 | 0.42 | 19.35 |
| Carbon Control | 2 | 92 | 5 | 0.19 | — |
| Polyoxometalate | 1 | 17 | 1 | 11.0 | 33.4 |
| Modified Carbon | 2 | 92 | 5 | 7.0 | — |
| Polyoxometalate | 1 | 20.5 | 1 | 5.7 | 32.6 |
| And DETA Modified | 2 | 88 | 5 | 0.34 | 31.9 |
| Carbon | 6 | 92 | 12 | 0.61 | — |
| Polyoxometalate and Pyridine Modified Carbon | 1 | 88 | 5 | 1.3 | 33.9 |
| Polyoxometalate | 1 | 20.5 | 1 | 4.3 | 29.7 |
| and PVP Modified | 2 | 17 | 5 | 1.7 | 28.5 |
| Carbon | 6 | 92 | 12 | 2.6 | — |
|  | 12 | 120 | 24 | 2.3 | 27.5 |
| Polyoxometalate | 1 | 88 | 5 | 0.10 | 34.5 |
| and TEPA Modified | 3 | 92 | 12 | 0.10 | 30.9 |
| Carbon | 183 | 48 | 23 | 0.30 | 29.8 |

As can be seen from Table 1, the capacitor having polyoxometalate-modified carbon electrodes possesses a much greater charge storge capacitance (33.4 farads/g) than the capacitor using unmodified carbon (19.35 farads/g), but at the expense of greatly increased leakage current (7–11 ma versus 0.19–0.42 ma, respectively). The addition of a compound having at least one ionic site, such as pyridine, or multiple ionic sites, such as DETA, PVP and TEPA, to stabilize the polyoxometalate-modified carbon does not significantly affect the charge storage capacity of such a material, but as shown in Table 1, does reduce the leakage current of an energy storage device that incorporates electrodes using these materials.

EXAMPLE 2

This example demonstrates the subject invention whereby the polyoxometalate compound is stabilized by an amine through an acid/base reaction. Three tests were conducted for this Example; one control test wherein an electric double layer capacitor was fabricated using two unmodified carbon control electrodes, a second control test wherein a capacitor was fabricated using carbon electrodes that were modified by the polyoxoanion, $H_3PMo_{12}O_{40}$, and one test wherein the carbon electrodes for the capacitor were modified by the polyoxoanion used in the above test run and further modified by an acid/base reaction with the amine dipropylenetriamine (DPTA).

The carbon used in each of the electrodes of this Example was an activated carbon commercially available under the tradename Witco 950 from the Witco Chemical Company. This carbon had a BET surface area of about 1076 m²/g and a pore diameter (Angstroms) to pore area (m²/g) distribution about as follows: <20/1033; 20–30/37; 30–40/2; 40–50/1; 50–60/0.4 and 60–300/3.

The unmodified control carbon was processed into an electric double layer capacitor as taught in Example 1. The electric double layer capacitor control having $H_3PMo_{12}O_{40}$ polyoxometalate-modified carbon electrodes was prepared in the same manner as taught in Example 1 for polyoxometalate-modified carbon electrode capacitors.

The capacitor having the DPTA and polyoxometalate modified carbon electrodes was fabricated from electrodes having been exposed to an acid/base polyoxometalate/amine reaction which proceeded as follows:

About 0.25 g of DPTA was dissolved in about 20 ml of methanol. This solution was then admixed with about 25 g of Witco 950 carbon to form a thick paste. The paste was dried at about 75° C. for about 45 minutes. About 6.25 g of the polyoxometalate $H_3PMo_{12}O_{40}$ was separately dissolved in about 29 g of methanol, which resultant solution was then mixed with the DPTA-impregnated carbon. The solvent was allowed to evaporate at about 100° C. and the carbon was further washed with methanol. This process was repeated with the exception that the 0.25 g of DPTA dissolved in methanol was increased to 1.0 g of DPTA in 20 ml of methanol. The resultant carbon from this procedure was found to contain about 35 weight percent polyoxometalate.

The carbon was then used to fabricate electrodes and a capacitor as taught in Example 1 above. Characteristics of the capacitors formed in Example 2 are shown in Table 2. As can be seen, the capacitor having amine-stabilized and polyoxometalate-modified carbon electrodes exhibits a capacitance that is comparable to the capacitor having only polyoxometalate-modified carbon electrodes, and the former also has a significantly lower leakage current than the latter.

TABLE 2

Electrical Properties of Capacitors Having Various Modified Capacitor Electrodes

| CAPACITOR ELECTRODE | CHARGING TIME (hrs.) | LEAKAGE CURRENT (ma) | CAPACITANCE (farads/g) |
|---|---|---|---|
| Unmodified Carbon Control | 69 | 0.43 | 22 |
| $H_3PMo_{12}O_{45}$ | 92 | 3.7 | 43 |

TABLE 2-continued

Electrical Properties of Capacitors
Having Various Modified Capacitor Electrodes

| CAPACITOR ELECTRODE | CHARGING TIME (hrs.) | LEAKAGE CURRENT (ma) | CAPACITANCE (farads/g) |
|---|---|---|---|
| Modified Carbon $H_3PMo_{12}O_{40}$ and DPTA Modified Carbon | 69 | 1.1 | 42 |

It is to be understood that the foregoing examples have been provided to enable those skilled in the art to have representative examples by which to evaluate the invention and that these examples should not be construed as any limitation on the scope of this invention. Inasmuch as the composition of the modified activated carbon electrodes employed in the present invention can be varied within the scope of the total specification disclosure, neither the particular ionic site compound, polyoxometalate or activated carbon components, nor the relative amounts of the components in the electrodes exemplified herein, nor the exemplified techniques for disposing the ionic site compound and polyoxometalate onto the carbon shall be construed as limitations of the invention.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. An improved carbon-based electrode, which electrode comprises an activated carbon electrode having a polyoxometalate compound stabilized on the activated carbon surface by a compound capable of generating at least one ionic site.

2. The electrode in accordance with claim 1 wherein said polyoxometalate compound is represented by the formula:

$$A_a[L_lM_mJ_zO_y]$$

wherein
A is at least one ion selected from the group consisting of hydrogen, the Group I-A to VIII-A or I-B to VII-B elements, the rare earths or actinides, ammonium, alkyl ammonium, alkyl phosphonium and alkyl arsonium;
L is at least one element selected from the group consisting of hydrogen and Group III-B to VII-B elements;
M is at least one metal selected from the group consisting of Group I-A to IV-A metals, Group VII-A to II-B metals, the rare earths and actinides; and
J is at least one metal selected from the group consisting of Group V-A metals and Group VI-A metals; and
a is a number which when multiplied by the valence of A will balance the charge on the polyoxometalate complex within the brackets;
l is a number ranging from zero to about 20;
m is a number ranging from zero to about 20;
z is a number ranging from about 1 to about 50; and
y is a number ranging from about 7 to about 150.

3. The electrode in accordance with claim 2 wherein L is at least one element of the group P,As,Si,Al,H,Ge,Ga, and B; M is at least one element of the group Zn,Ti,Mn,Fe,Co,Ni,Rh,Zr and Re; and J is at least one metal of the group Mo, W and V; and
wherein
l ranges from zero to about 4;
m ranges from zero to about 6;
z ranges from about 6 to about 24; and
y ranges from about 18 to about 80.

4. The electrode in accordance with claim 1 wherein said activated carbon has a BET surface area of from about 100 $m^2/g$ to about 2000 $m^2/g$.

5. The electrode in accordance with claim 1 wherein said activated carbon has a BET surface area of from about 500 $m^2/g$ to about 1500 $m^2/g$.

6. The electrode in accordance with claim 1 wherein said compound capable of generating at least one ionic site is an amine compound.

7. The electrode in accordance with claim 6 wherein said amine is selected from the group consisting of pyridine, polyvinylpyridine, diethylenetriamine, dipropylenetriamine and tetraethylenepentamine.

8. An energy storage device comprising a pair of electrodes electrically isolated from each other, an electrolyte in contact with the electrodes and means for collecting electrical current therefrom; at least one electrode comprising an activated carbon electrode having a polyoxometalate compound stabilized on the activated carbon surface by a compound capable of generating at least one ionic site.

9. An electric double layer capacitor comprising a housing, at least one pair of spaced activated carbon electrodes in the housing, an electrolyte in contact with said electrodes, and an ionically conductive separator interposed between said electrodes and in contact therewith, the electrodes comprising activated carbon having a polyoxometalate compound stabilized on the activated carbon surface by a compound capable of generating at least one ionic site.

10. A process for making an improved carbon-based electrode comprising contacting a polyoxometalate compound and a compound capable of generating at least one ionic site in the presence of activated carbon so as to stably dispose the polyoxometalate on the activated carbon.

11. The process in accordance with claim 10 wherein said contacting occurs by ion exchange.

12. The process in accordance with claim 11 wherein said polyoxometalate compound is adsorbed on the activated carbon prior to ion exchanging.

13. The process in accordance with claim 11 wherein said compound capable of generating at least one ionic site is adsorbed on said activated carbon prior to ion exchanging.

14. The process in accordance with claim 11 wherein said compound capable of generating at least one ionic site is multidentate.

15. The process in accordance with claim 11 wherein said compound capable of generating at least one ionic site is an amine compound.

16. The process in accordance with claim 15 wherein said amine is selected from the group consisting of pyridine, polyvinylpyridine, diethylenetriamine, dipropylenetriamine and tetraethylenepentamine.

17. The process in accordance with claim 10 wherein said contacting occurs by an acid/base reaction.

18. The process in accordance with claim 17 wherein said compound capable of generating at least one ionic site is a multidentate compound.

19. The process in accordance with claim 17 wherein said compound capable of generating at least one ionic site is an amine compound.

20. The process in accordance with claim 19 wherein said amine is selected from the group consisting of pyridine, polyvinylpyridine, diethylenetriamine, dipropylenetriamine and tetraethylenepentamine.

* * * * *